(12) United States Patent
Schleinzer (10) Patent No.: US 8,469,586 B2
(45) Date of Patent: Jun. 25, 2013

(54) DEVICE WITH SWIVEL MOUNTING FEATURE FOR PROCESSING FOOD

(76) Inventor: Werner Schleinzer, Laxenburg (AT)

( * ) Notice: Subject to any disclaimer, the term of this patent is extended or adjusted under 35 U.S.C. 154(b) by 217 days.

(21) Appl. No.: 12/868,549

(22) Filed: Aug. 25, 2010

(65) Prior Publication Data

US 2011/0057062 A1 Mar. 10, 2011

(30) Foreign Application Priority Data

Aug. 28, 2009 (DE) .................... 20 2009 011 685 U (51) Int. Cl.
*A47J 43/046* (2006.01)
*A47J 43/07* (2006.01)

(52) U.S. Cl.
USPC ............ 366/202; 366/205; 366/206; 366/316

(58) Field of Classification Search
USPC ................. 366/138, 197, 200–202, 205–207, 366/224, 255–260, 316; 99/348
See application file for complete search history.

(56) References Cited

U.S. PATENT DOCUMENTS

| | | | | | |
|---|---|---|---|---|---|
| 2,268,038 | A | * | 12/1941 | Knittel | 366/192 |
| 2,405,056 | A | | 7/1946 | Irving | |
| 2,984,462 | A | * | 5/1961 | O'Connor | 366/316 |
| 3,704,864 | A | | 12/1972 | Lee | |
| 4,135,828 | A | * | 1/1979 | Cabak | 366/197 |
| 4,432,650 | A | * | 2/1984 | Langen et al. | 366/147 |
| 4,813,787 | A | * | 3/1989 | Conn | 366/296 |
| 4,957,373 | A | * | 9/1990 | Derksen et al. | 366/197 |
| 5,123,747 | A | * | 6/1992 | Derksen | 366/197 |
| 5,720,552 | A | | 2/1998 | Schindlegger | |
| 5,836,687 | A | * | 11/1998 | Khalid | 366/207 |
| 6,350,053 | B1 | * | 2/2002 | Morin | 366/205 |
| 6,575,616 | B2 | * | 6/2003 | D'Agostino | 366/316 |
| 6,802,641 | B2 | * | 10/2004 | Ladatto et al. | 366/200 |
| 7,476,018 | B2 | * | 1/2009 | McGill et al. | 366/197 |
| D618,496 | S | * | 6/2010 | Schleinzer | D7/376 |
| D624,359 | S | * | 9/2010 | Schleinzer | D7/412 |
| 2011/0057062 | A1 | * | 3/2011 | Schleinzer | 241/98 |

FOREIGN PATENT DOCUMENTS

| | | |
|---|---|---|
| BE | 527203 | 3/1954 |
| DE | 3700013 A1 | 7/1988 |
| DE | 29612341 U1 | 10/1996 |
| DE | 9422100 | 2/1998 |

(Continued)

OTHER PUBLICATIONS

European Search Report and Opinion dated Jul. 29, 2010 for European Patent Application No. 10 00 1580.

*Primary Examiner* — Charles E Cooley
(74) *Attorney, Agent, or Firm* — James P. Muraff; Neal, Gerber & Eisenberg LLP (57) ABSTRACT

A kitchen appliance (10) for processing food, and in particular for producing blended beverages is provided. The kitchen appliance (10) includes a drive unit (12), and is swivel-mounted in a support unit (14). In addition the kitchen appliance (10) includes an attachment section (18) that is designed to accommodate a mixing container (30) in such a way that the attachment section (18) and the mixing container (30) define a hermetically sealed mixing space in which the cutting and/or stirring unit (20) is located. Food located in the mixing container (30) is fed to the cutting and/or stirring unit (20) on account of gravity. Preferably the attachment section (18) is composed of a cylindrical recess in the drive unit (12). Alternatively, the attachment section (18), preferably in the form of a cylindrical dish, and the cutting and/or stirring unit (20) can be designed as an insert that can be removed from and replaced back in the drive unit.

10 Claims, 8 Drawing Sheets

FOREIGN PATENT DOCUMENTS

| | | |
|---|---|---|
| DE | 202005006819 U1 | 7/2005 |
| EP | 1264669 A1 | 12/2002 |
| EP | 1330341 B1 | 12/2005 |
| FR | 1429231 A | 2/1966 |
| GB | 2088201 A | 6/1982 |
| JP | 56-074629 | 6/1981 |
| WO | 02/38011 | 5/2002 |
| WO | 2004110706 A1 | 12/2004 |
| WO | 2006126009 | 11/2006 |

\* cited by examiner

DEVICE WITH SWIVEL MOUNTING FEATURE FOR PROCESSING FOOD

CROSS-REFERENCE TO RELATED PATENT APPLICATIONS

This application claims priority from and the benefit of German Patent Application No. 20 2009 011 685.9, filed on Aug. 28, 2009, in the German Intellectual Property Office, the disclosure of which is incorporated herein in its entirety by reference.

FIELD OF THE INVENTION

The present invention concerns a device or kitchen appliance for processing food, and in particular for producing blended beverages. In particular, the invention concerns a kitchen appliance for making smoothies from solid or liquid foodstuffs, such as fruit, vegetables, and the like.

BACKGROUND OF THE INVENTION

Smoothies are beverages made from whole fruits, for which—in contrast to conventional fruit juices—usually the whole fruit is processed, except for the seeds. Thus the basis of a smoothie is the fruit pulp or fruit puree, which is mixed according to the recipe with juices to obtain a smooth and creamy consistency. However, there are also smoothies that additionally contain such ingredients as yogurt, milk, ice cream or other foods.

Kitchen appliances for making smoothies are known. In these prior art kitchen appliances, a cutting and stirring unit with multiple blades, which can be set in rotation by a motor in order to puree and stir the food, is located at the bottom end of a mixing container into which the foods to be mixed are placed from above. Also located at the bottom end of the mixing container is a closable outlet, out of which the finished liquid product that was produced in the mixing container can flow, for example into a tumbler located beneath the outlet. A disadvantage of these prior art devices is that the cutting and stirring unit in the mixing container is difficult to access, which makes it difficult to clean this component.

The object of the present invention is to provide an improved kitchen appliance for processing food and, in particular, for producing blended beverages. It is an additional object of the present invention to provide an improved cutting and/or stirring unit for such a kitchen appliance.

SUMMARY OF THE INVENTION

The first abovementioned object is attained by a kitchen appliance. The kitchen appliance according to the invention consists in essence of a drive unit, which is swivel-mounted in a support unit so that the drive unit can be swiveled from a rest position into an operating position and back again. The kitchen appliance also includes a cutting and/or stirring unit, which can be operated by the drive unit, and an attachment section, which is designed to accommodate a mixing container in such a way that the attachment section and the mixing container define a hermetically sealed mixing space, in which the cutting and/or stirring unit is located or into which the cutting and/or stirring unit projects at least partly. When the drive unit is in the operating position, the cutting and/or stirring unit is arranged in the lower section of the mixing space in such a way that food located in the mixing container is fed to the cutting and/or stirring unit due to gravity.

Preferably the attachment section is composed of a cylindrical recess in the drive unit. Alternatively, the attachment section, preferably in the form of a cylindrical dish, and the cutting and/or stirring unit can be designed as an insert that can be removed from and replaced back in the drive unit.

The second of the above-mentioned objects is attained by a cutting and/or stirring unit. The inventive cutting and/or stirring unit includes a shaft for coupling to a drive unit, at the end of which is located an essentially solid stirrer plate. Attached to the stirrer plate are multiple blades, which project from the stirrer plate. Preferably the stirrer plate has a diameter of at least approximately 2 cm.

According to a preferred embodiment, multiple semicircular holes are provided in the stirrer plate, with a quadrant-shaped dome being connected to the circular arc of each semicircular hole in the stirrer plate. In this design, the inside of each quadrant-shaped dome and semicircular hole forms a passage that permits fluid communication between the top and bottom of the stirrer plate.

Additional advantageous embodiments are defined in the dependent claims.

BRIEF DESCRIPTION OF THE DRAWINGS

The attached figures illustrate preferred exemplary embodiments of a kitchen appliance for processing food and in particular for producing blended beverages, and are used to elucidate the invention.

DETAILED DESCRIPTION OF THE PREFERRED EMBODIMENTS

Figure 1:
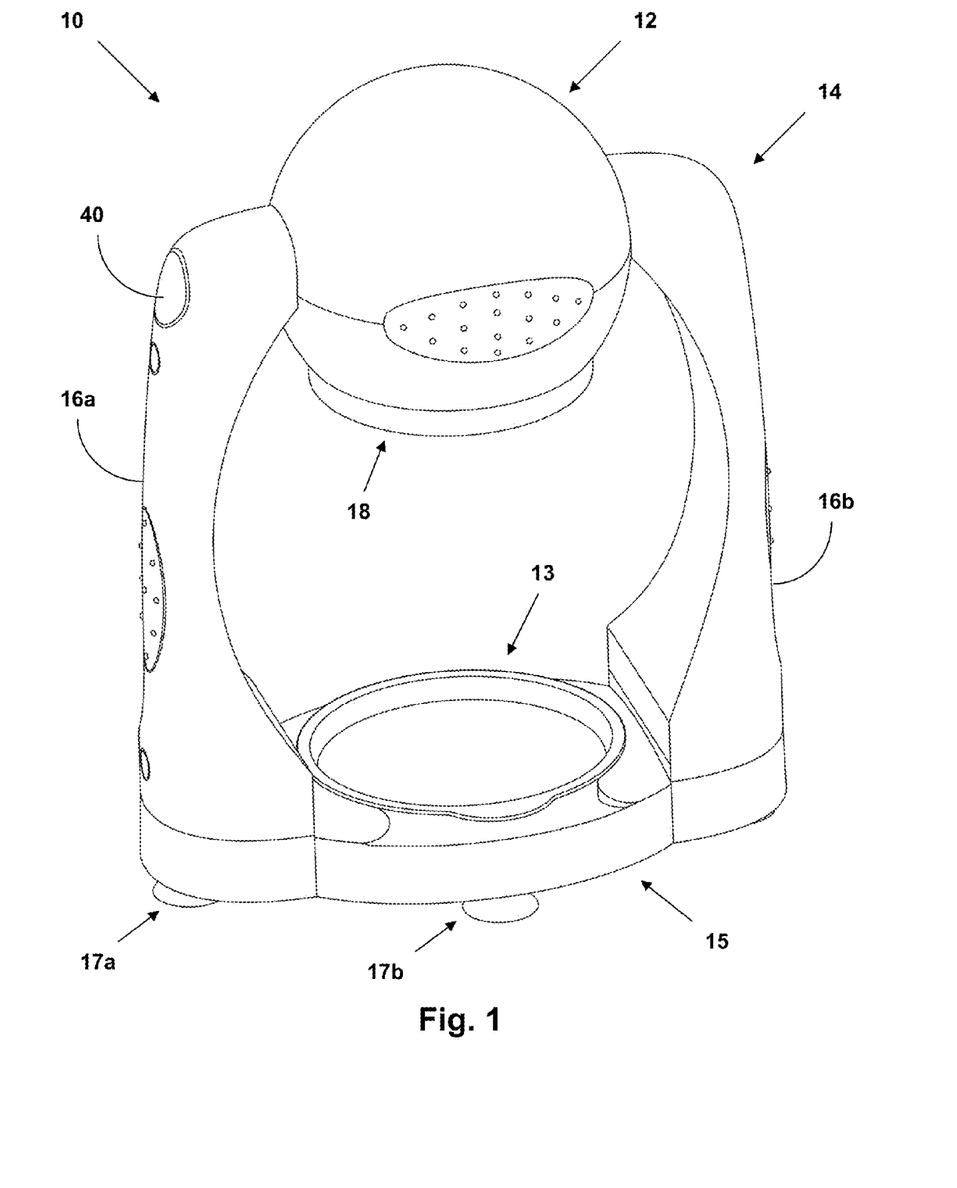
FIG. 1 shows a perspective view, at an angle from above, of a kitchen appliance according to a preferred embodiment for processing food, in which the drive unit is in the rest position.

FIG. 1 shows a kitchen appliance 10 according to a preferred embodiment for processing food and in particular for making blended beverages from solid or liquid foodstuffs such as juice, milk, yogurt, fruit, vegetables, and the like. The kitchen appliance 10 includes a drive unit 12, which is held by a support unit 14 such that it can swivel. In the preferred embodiment shown in FIG. 1, the support unit 14 consists of a base or foot 15 and two support arms 16a, 16b, wherein the drive unit 12 is swivel-mounted between the two support arms 16a, 16b at the upper ends thereof. Suction cups 17a, 17b may be provided on the underside of the base 15 in order to ensure that the kitchen appliance 10 stands securely on a flat surface, such as a kitchen counter or kitchen table. Instead of two support arms 16a, 16b, the support unit 14 may of course also include only one support arm on which the drive unit 12 is suitably mounted.

In the preferred embodiment shown in the figures, the drive unit 12 is essentially spherical in shape. As already mentioned above, the drive unit 12 is swivel-mounted to rotate about an axis of rotation A between the two support arms 16a, 16b (see also FIG. 3 and FIG. 4). In other words, out of a rest position, which is shown, e.g., in FIG. 1, the drive unit 12 can be swiveled by 180 degrees into an operating position, which is shown, e.g., in FIG. 2. This swiveling of the drive unit 12 out of the rest position into the operating position and back again can be accomplished manually and/or automatically, for example by means of a switch provided on the support unit 14 and a suitable motor drive (not shown).

Figure 2:
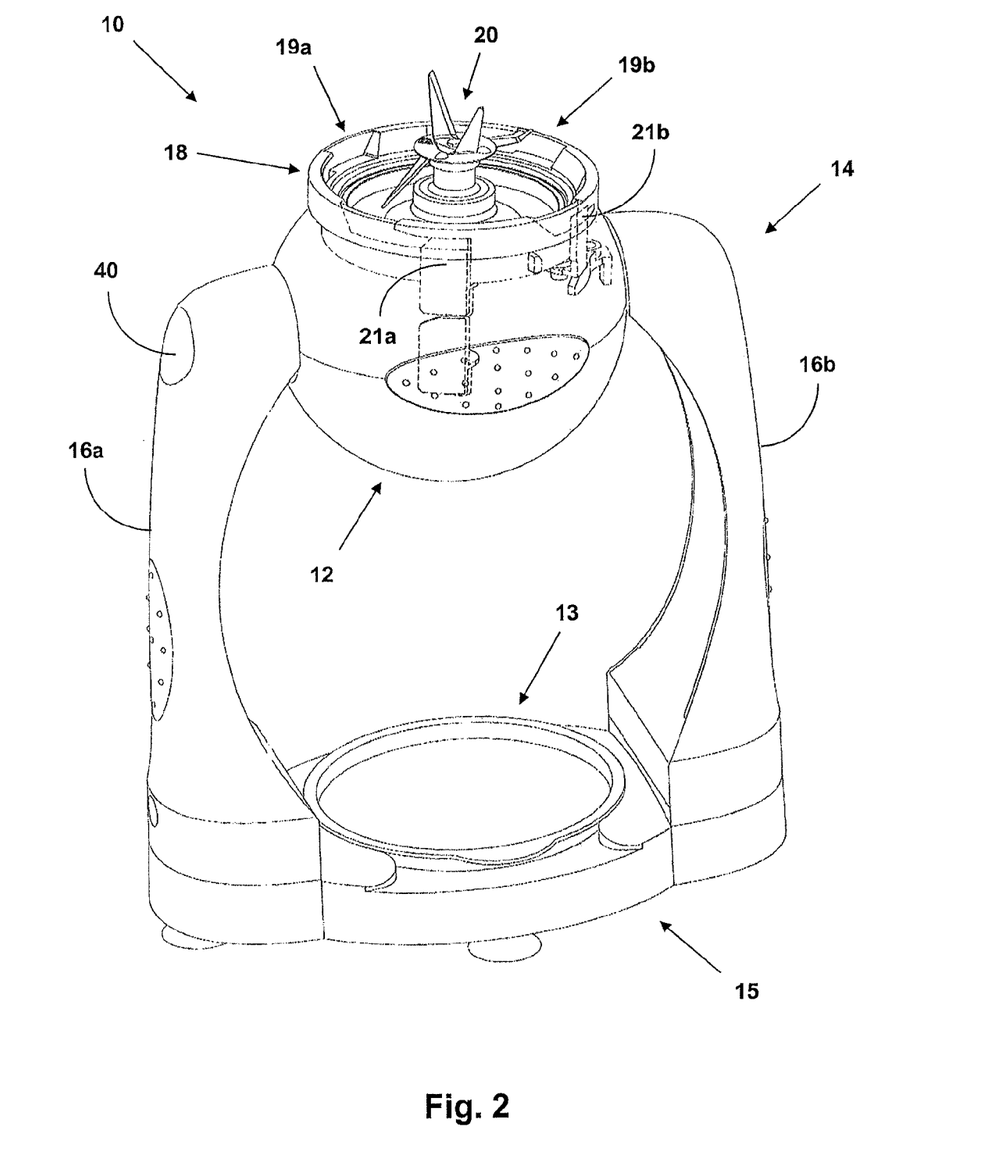
FIG. 2 shows the kitchen appliance from FIG. 1, in which the drive unit has been swiveled by 180 degrees into the operating position.
Figure 3:
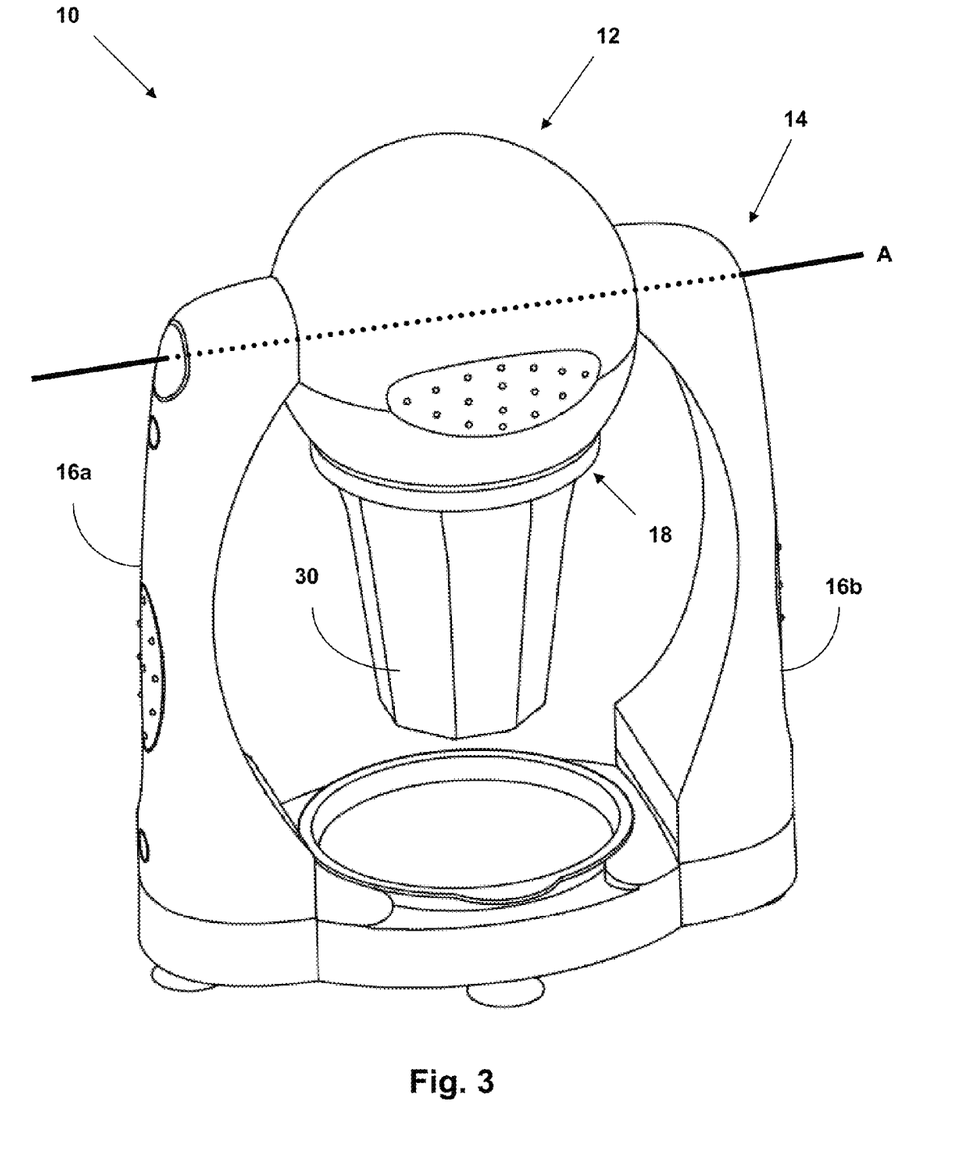
FIG. 3 shows the kitchen appliance from FIG. 1, in which a mixing container has been attached to the drive unit in the rest position.

As can be seen especially well in FIG. 2, an attachment section 18 in the form of a cylindrical recess is provided on a section of the essentially spherical drive unit 12, which projects upward relative to the axis of rotation A when in the operating position, and downward in the rest position. In the center of the attachment section 18, which is to say in the center of the cylindrical recess, is located a cutting and/or stirring unit 20, whose precise design is described below with reference to FIGS. 8a through 8d. In this context, the cutting and/or stirring unit 20 is connected to, for example, an electric motor (not shown) located inside the spherical drive unit 12, in such a manner that the cutting and/or stirring unit 20 can be set in rotation by the electric motor.

The attachment section 18 of the drive unit 12 is additionally designed such that it accommodates a mixing container 30 in such a way that the attachment section 18 and the mixing container 30 together define a hermetically sealed or fluid-tight mixing space, in which the cutting and/or stirring unit 20 is located or into which it projects. When the drive unit 12 is in the operating position, the cutting and/or stirring unit 20 is arranged in the lower section of the mixing space in such a way that food located in the mixing container 30 is fed to the cutting and/or stirring unit 20 on account of gravity. This operating position of the drive unit 12 is shown in FIG. 2 without a mixing container and in FIG. 4 with the mixing container 30.

Figure 6A:
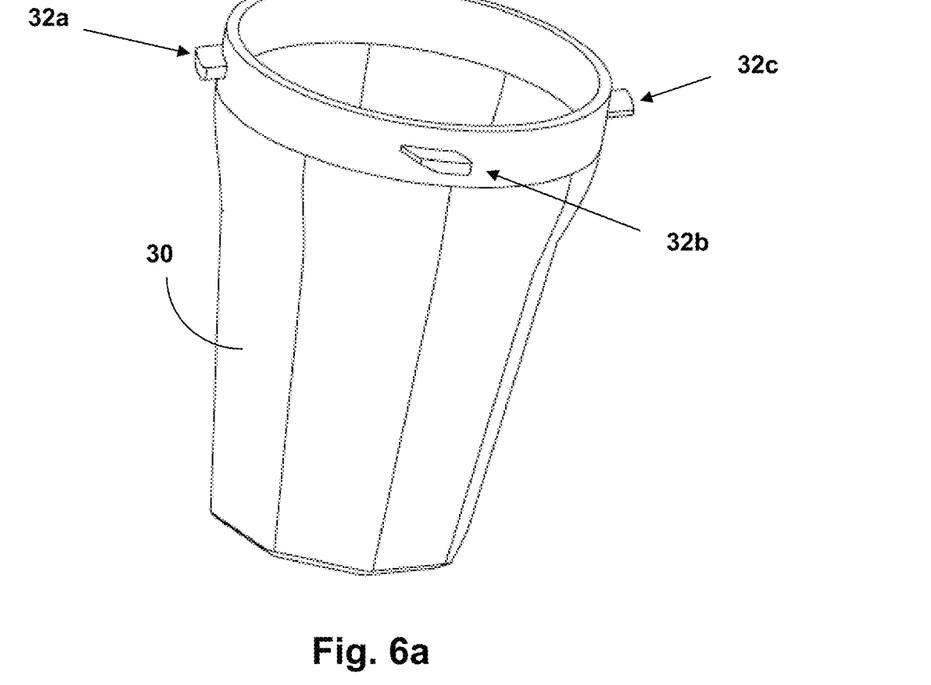
FIGS. 6a and 6b each show a detail view of a mixing container or of a cleaning container that are suitable for use with the kitchen appliance from FIG. 1.

For sealing engagement of the mixing container 30 by the attachment section 18, diametrically opposed pilot slots 19a, 19b, preferably four in number (two of which are visible in FIG. 2), are provided on the inside of the circumference of the attachment section 18; these pilot slots have a larger inside diameter than the inside of the circumference of the attachment section 18. These pilot slots 19a, 19b are designed to accommodate a like number of lugs 32a, 32b, 32c of complementary shape that are located at the upper end of the mixing container 30, project radially therefrom, and extend along the circumference of the mixing container 30, as can be seen in FIG. 6a. At their lower ends, each of the pilot slots 19a, 19b transitions to a groove section extending a short distance in the circumferential direction. In this design, each groove section narrows with increasing distance from the pilot slot 19a, 19b standing in connection therewith. This design of the individual groove sections has the effect that when the mixing container 30, whose lugs 32a, 32b, 32c have been inserted in the pilot slots 19a, 19b, is rotated in the circumferential direction, the lugs 32a, 32b, 32c are brought into the groove sections and the mixing container 30 is moved towards the floor of the attachment section 18, and is thus pressed against the drive unit 12. Preferably an elastic sealing element, for example a sealing ring (not shown), is dimensioned and located on the floor of the attachment section 18 of the drive unit 12 in such a manner that the top edge of the mixing container 30 is pressed onto the sealing element when the mixing container 30 is locked in the groove sections.

As a result of the above-described locking engagement of the mixing container 30 by the drive unit 12 or its attachment section 18 in the form of a cylindrical recess, a fluid-tight mixing space between the attachment section 18 and the mixing container 30, into which the cutting and/or stirring unit 20 projects, is defined as described above. As is especially evident from viewing FIGS. 2 and 4 together, when the drive unit 12 is in the operating position, the cutting and/or stirring unit 20 is located in the lower section of the fluid-tight mixing space defined by the drive unit 12 or its attachment section 18 and by the mixing container 30.

The kitchen appliance 10 according to the invention is designed to be used, preferably, as follows. To start with, the drive unit 12 is in the rest position shown in FIG. 1, and the mixing container 30 is not attached to the drive unit 12. The user places the food to be mixed in the mixing container 30, and brings the mixing container 30, which has been filled to a specific level with the food to be mixed, to the attachment section 18 of the drive unit 12 in its rest position. As already described above, for this purpose the user inserts the lugs 32a, 32b, 32c at the top end of the mixing container 30 into the corresponding pilot slots 19a, 19b of the attachment section 18. In so doing, the user moves the mixing container 30 upward towards the drive unit 12 while simultaneously rotating the mixing container 30 so that the lugs 32a, 32b, 32c at the top end of the mixing container 30 are introduced into the groove sections, and the mixing container 30 is pressed against the drive unit 12. A person skilled in the art will recognize that the food to be mixed will remain in the bottom section of the mixing container 30 up to a certain level during this engagement of the mixing container 30 by the drive unit 12 as a result of gravity, without the need for contact between the food to be mixed and the cutting and/or stirring unit 20 or parts thereof (which is likewise possible, however).

Figure 4:
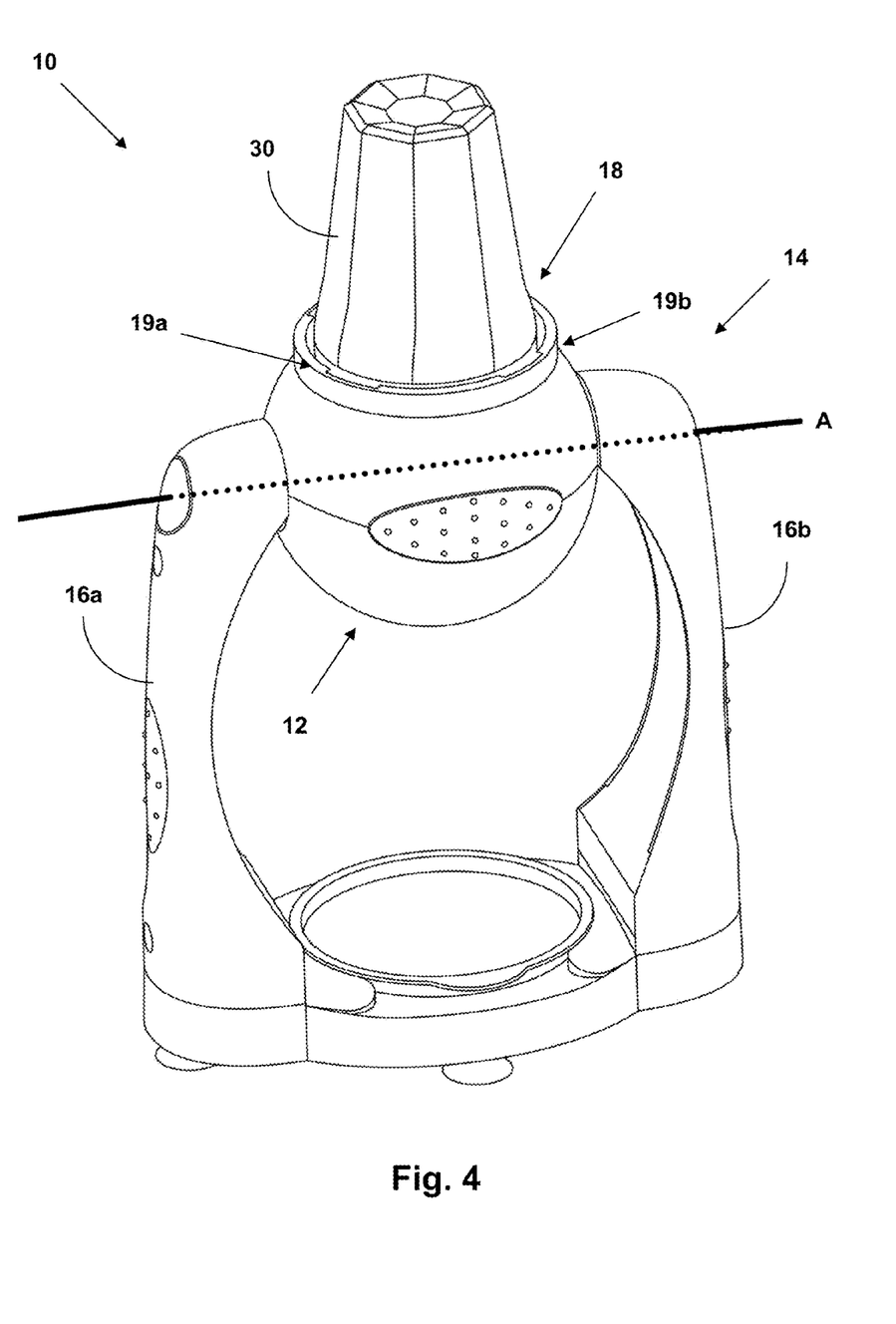
FIG. 4 shows the kitchen appliance from FIG. 3, in which the drive unit, with the mixing container attached thereto, has been swiveled by 180 degrees into the drive unit's operating position.

Once the mixing container 30 filled with the food to be mixed has been brought into fluid-tight, locking engagement with the attachment section 18 or the drive unit 12, the user can swivel the drive unit 12 with the mixing container 30 attached thereto by 180 degrees into the operating position shown in FIG. 4. As mentioned above, this can be accomplished manually or automatically. A person skilled in the art will recognize that during this swiveling of the drive unit 12 with the mixing container 30 attached thereto, the food to be mixed that is present in the mixing container 30 will obey gravity and collect in the top section of the mixing container 30. In other words, the food to be mixed in the mixing container 30 is delivered to the cutting and/or stirring unit 20 by this swiveling by 180 degrees of the drive unit 12 with the mixing container 30 attached thereto. In this operating position, the cutting and/or stirring unit 20 can be set in rotation by the electric motor of the drive unit 12, so that the food to be mixed that is present in the mixing container 30 is cut and/or stirred. To terminate the mixing process, the drive unit 12 with the mixing container 30 attached thereto is again swiveled by 180 degrees into the rest position, and the mixing container 30 can be removed from the attachment section 18 and the drive unit 12. In order to avoid soiling of the base 15 by food or fluid residue that remains on and drips from the cutting and/or stirring unit 20 or the attachment section 18 after the removal of the mixing container 30, a removable drip tray 13 can be provided on the base 15.

Preferably the kitchen appliance 10 according to the invention has a detent switch 40 to actuate the electric motor of the drive unit 12, and thus to rotate the cutting and stirring unit 20. In the rest position of the drive unit 12, the detent switch, which is located on one of the support arms 16a, 16b in the embodiment shown in the figures, is in a retracted or snapped-in position. When the drive unit 12 is swiveled by 180 degrees into the operating position shown in FIG. 4, the detent switch 40 snaps out into an extended position due to a preloading, for example by means of a spring. In this extended position of the detent switch 40, electricity is applied to the electric motor of the drive unit 12, and the cutting and/or stirring unit 20 is set in rotation. As soon as the detent switch 40 is moved back into the retracted position against the preloading, the supply of electricity to the electric motor of the drive unit 12 is interrupted, thus stopping the rotational motion of the cutting and/or stirring unit 20. Alternatively or in addition, the rotational motion of the cutting and/or stirring unit 20 can be terminated by the means that the drive unit 12, together with the mixing container 30, is swiveled back towards the rest position of the drive unit 12, thereby moving the detent switch back to the retracted position against the preloading, where it latches. This design has the advantage that it is possible to ensure that the cutting and/or stirring unit 20 can only perform a rotational motion in the operating position of the drive unit 12. Naturally, it is equally possible for the supply of electricity to the electric motor of the drive unit 12 to take place through an external switch (not shown), which may be provided on the support unit 14, for example.

As an additional safety function, the kitchen appliance 10 according to the invention can have at least one safety switch (21a or 21b-FIG. 2), with which it is possible to ensure that the electric motor of the drive unit 12 can only set the cutting and/or stirring unit 20 in rotation when a mixing container 30 or a cleaning container 50—described in detail below—is engaged in a fluid-tight manner by the attachment section 18. Preferably, such a safety switch 21a or 21b is located in the groove section of a pilot slot 19a, 19b of the attachment section 18 as seen in FIG. 2. If no mixing container 30 is attached to the drive unit 12, the safety switch 21a or 21b projects into the groove section of a pilot slot 19a, 19b of the attachment section 18 due to a preloading. In this extended position of the safety switch (off position), the safety switch interrupts the supply of electricity to the electric motor of the drive unit 12. If a mixing container 30 is now brought into fluid-tight engagement with the attachment section 18 as described above, a lug 32a, 2b, 32c of the mixing container 30 presses the safety switch 21a or 21b into a retracted position against the preloading. In this retracted position of the safety switch (on position), no interruption of the supply of electricity to the electric motor of the drive unit 12 by the safety switch takes place. Preferably, a safety switch 21a or 21b is provided in the respective groove section of more than one pilot slot 19a, 19b so that additional safety is ensured during cleaning with pointed objects in the vicinity of the pilot slots 19a, 19b of the attachment section 18 and their groove sections.

Figure 5:
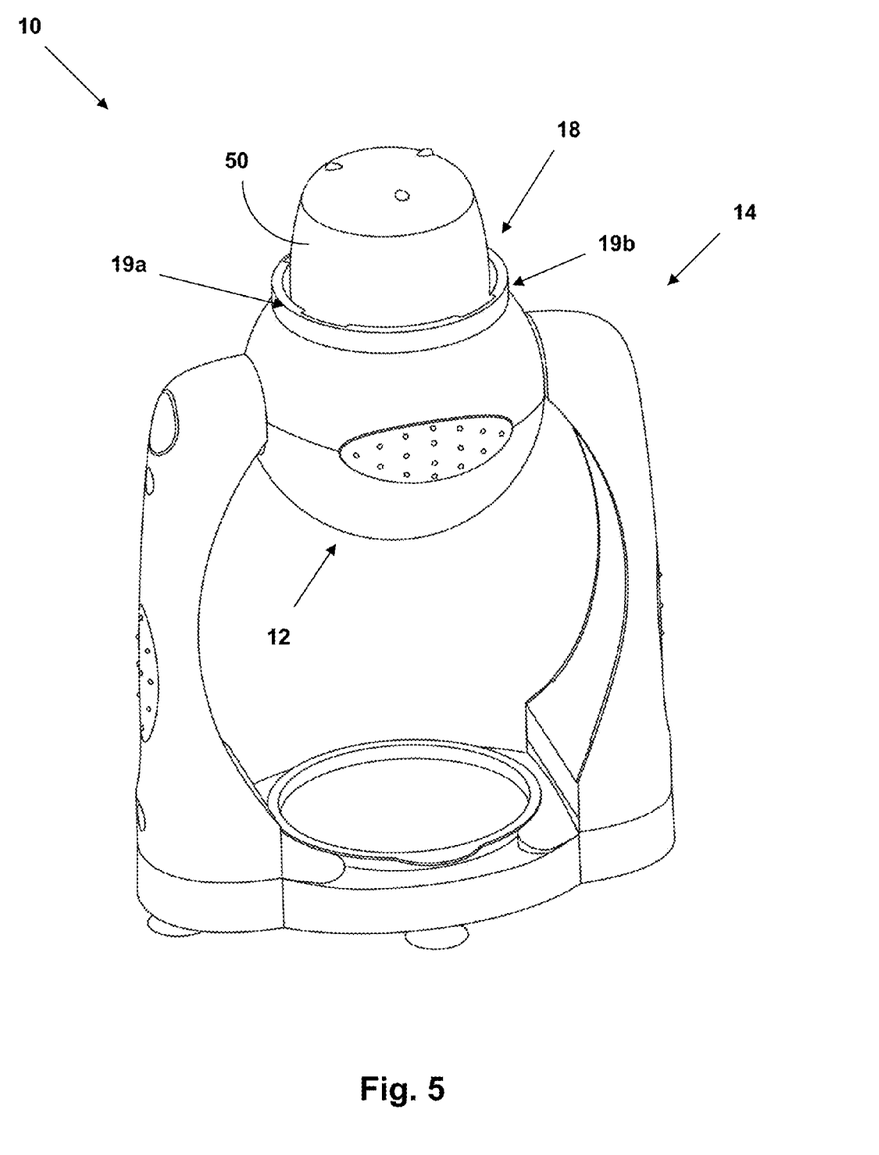
FIG. 5 shows the kitchen appliance from FIG. 1, in which a cleaning container has been attached to the drive unit, and the drive unit is in the operating position.
Figure 6B:
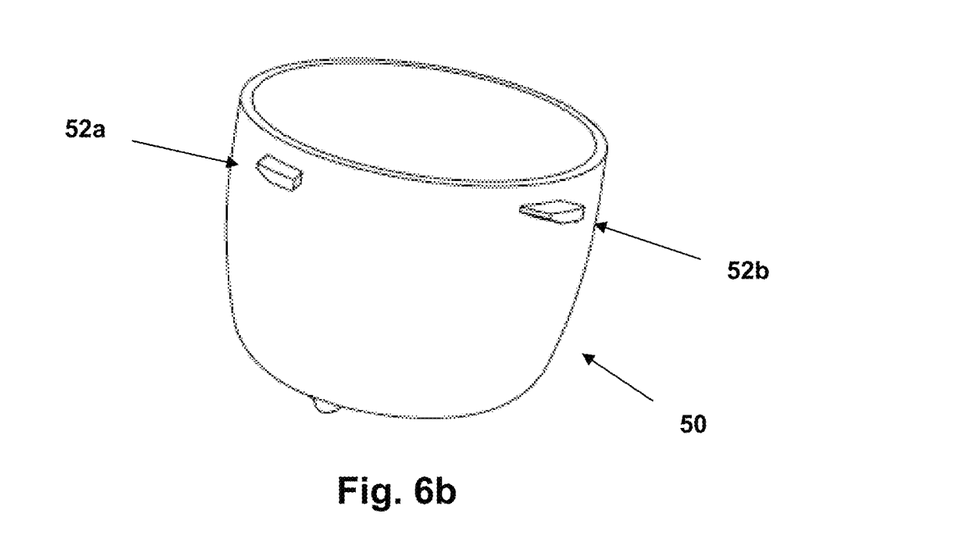

For cleaning of the kitchen appliance according to the invention 10, preferably a cleaning container 50 is provided, which is depicted separately in FIG. 6b and in FIG. 5 is attached to the drive unit 12 that has been swiveled into the operating position. Other than a smaller volume and a slightly different shape, the design of the cleaning container 50 corresponds essentially to the design of the mixing container 30 described above. In particular, the cleaning container 50 likewise includes a plurality of lugs 52a, 52b at its top edge for fluid-tight engagement with the attachment section 18 of the drive unit 12 (see FIG. 6b). To clean the kitchen appliance according to the invention 10, the cleaning container 50 can be filled with a cleaning liquid, for example water and/or a washing liquid. As is evident to a person skilled in the art, the cleaning container 50 does not have to be filled completely for cleaning because of the swivel mechanism of the kitchen appliance according to the invention 10. It may suffice, for example, for the cleaning container 50 to be filled only halfway or with a smaller volume. Once the cleaning container 50 has been brought into fluid-tight engagement with the attachment section 18 in the rest position of the drive unit 12 as described above for the mixing container 30, the drive unit 12, together with the cleaning container 50 attached thereto, is swiveled by 180 degrees into the operating position of the drive unit 12. As described above for the mixing container 30, during this swiveling of the drive unit 12 with the cleaning container 50 attached thereto the cleaning liquid present in the cleaning container 50 collects in the top section of the cleaning container 50 into which the cutting and/or stirring unit 20 projects, in obedience to the force of gravity. In this operating position, the cutting and/or stirring unit 20 can be set in rotation by the electric motor of the drive unit 12 so that the cleaning liquid present in the cleaning container 50 is stirred and brought into contact primarily with the floor and inner sides of the attachment section 18 and with the cutting and/or stirring unit 20. To terminate the cleaning process, the drive unit 12 with the cleaning container 50 attached thereto is again swiveled by 180 degrees into the rest position, and the cleaning container 50 can be removed from the drive unit 12.

Figure 7:
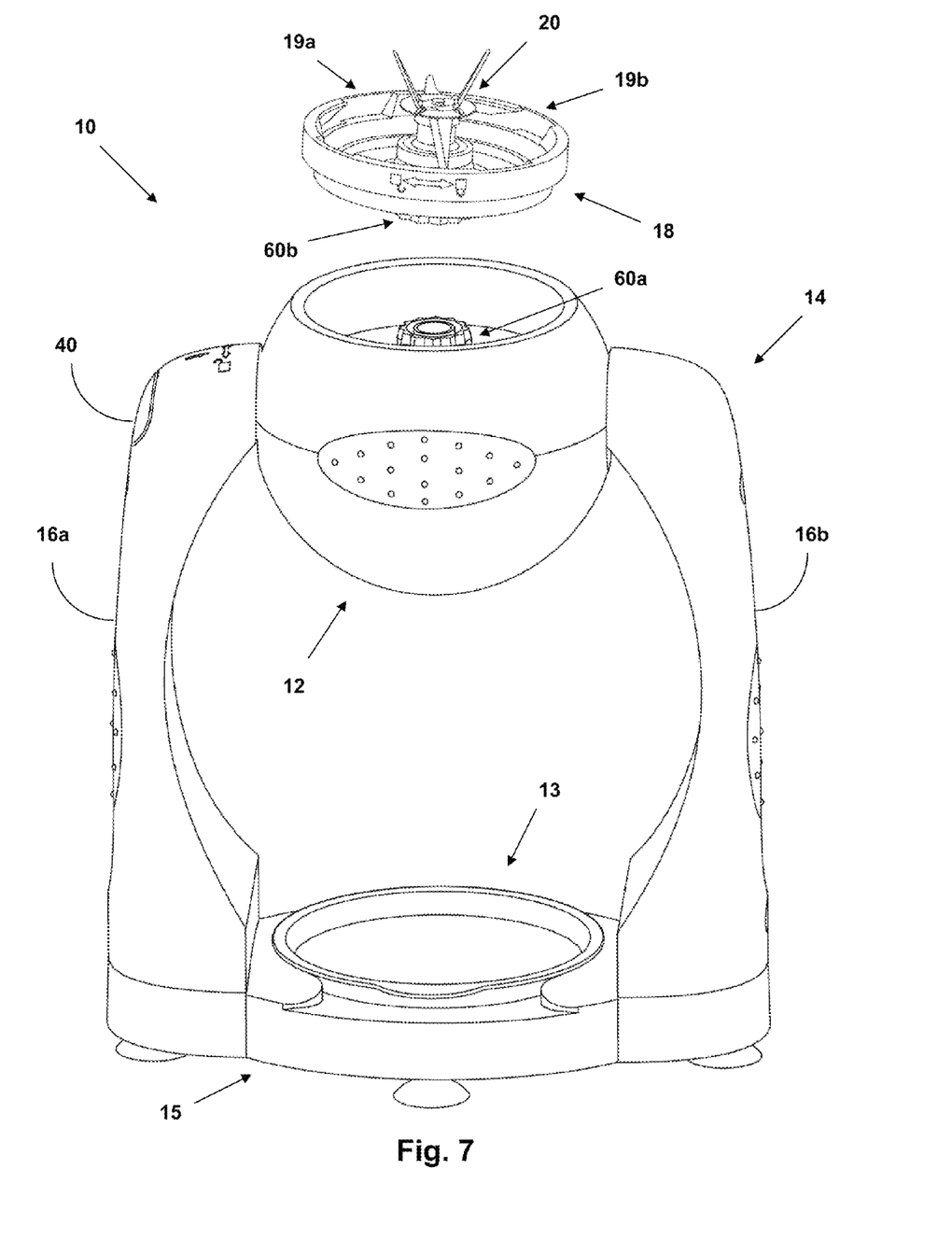
FIG. 7 shows a perspective view of a kitchen appliance according to another preferred embodiment for processing food, in which the cutting and/or stirring unit and the attachment section are designed as an insert that can be removed from the drive unit.

According to another preferred embodiment of the invention, which is shown in FIG. 7, the attachment section 18 and the cutting and/or stirring unit 20 are designed as an insert that can be removed from, and replaced in, the drive unit 12. In this design, the attachment section 18 essentially takes the form of a cylindrical dish, which fits into a cylindrical recess of complementary design that is formed in the drive unit 12. This design, in which the cutting and/or stirring unit 20 and the attachment section 18 form a unit, rather than the drive unit 12 and the attachment section 18 as in the embodiment described above, has the advantage that, in the case of heavy soiling of the attachment section 18 and/or of the cutting and/or stirring unit 20, the insert consisting of these elements can be removed in its entirety from the drive unit 12 in order to clean the insert consisting of the attachment section 18 and cutting and/or stirring unit 20, either manually or in a dishwasher. After cleaning, the insert can be replaced in the drive unit 12. Naturally, in this design the connection between the insert consisting of the attachment section 18 and cutting and/or stirring unit 20, and the drive unit 12 in the installed state must be such that the cutting and/or stirring unit 20 can still be driven by the electric motor that is housed in the drive unit 12. This can be accomplished, for example, by an appropriately designed pair of intermeshing gears 60a, 60b, wherein one gear 60a is connected to the shaft of the electric motor of the drive unit 12, and is located in the center of the cylindrical recess of the drive unit 12, and the other gear 60b is connected to the shaft of the cutting and/or stirring unit 20 and is located on the underside of the attachment section 18. In this design, the two gears 60a, 60b are located relative to one another in the installed state of the insert consisting of the attachment section 18 and cutting and stirring unit 20 such that they mesh with one another so that the electric motor of the drive unit 12 can set the cutting and/or stirring unit 20 in rotation.

In this embodiment shown in FIG. 7, in which the attachment section 18 and the cutting and/or stirring unit 20 are designed as an insert that can be removed from and replaced in the drive unit 12, a locking mechanism can optionally be provided as an additional safety function. For example, in a manner similar to the attachment of a mixing container 30 to the attachment section 18 or the drive unit 12, the insertion of the insert into the drive unit 12 can consist of a straight-line insertion motion and a rotational motion in order to lock the insert consisting of the attachment section 18 and cutting and/or stirring unit 20, in the drive unit 12. In addition, a safety mechanism can be provided that is designed such that a mixing container 30 can only be attached to or removed from the insert inserted in the drive unit 12 when the drive unit 12 is in the rest position, and/or such that the insert consisting of the attachment section 18 and cutting and/or stirring unit 20 can only be inserted in or removed from the drive unit 12 when the latter is in the drive position. A safety mechanism of this nature can be designed such that the drive unit 12 must first be swiveled into the rest position for the removal of a mixing container 30, for example. In this rest position of the drive unit 12, the insert cannot be removed, so that only the mixing container 30 can be removed. In order to also be able to remove the insert consisting of the attachment section 18 and cutting and/or stirring unit 20, the drive unit 12, from which the mixing container 30 has already been removed, must be swiveled back into the operating position.

FIGS. 8a through 8d show various views of a preferred cutting and/or stirring unit 20, which can be used to particular advantage with the above-described inventive embodiments of a kitchen appliance 10, but can also be used with other kitchen appliances. The inventive cutting and/or stirring unit 20 includes a shaft 22 for coupling to a suitably designed drive unit, for example the above-described drive unit 12. Located at one end of the shaft 22, perpendicular to the longitudinal axis of the shaft 22, is an essentially solid stirrer plate 24. A plate of this nature is known in principle for use in hand mixers for whipping cream. In this design, the liquid cream is carried along by the plate, and air is incorporated therein, as a result of the plate's rapid rotation due to adhesive forces, promoting the formation of whipped cream. Surprisingly, it has been discovered within the scope of the present invention that a combination of such a plate for whipping cream with a plurality of blades projecting from the plate in different directions produces a cutting and/or stirring unit that is suited in an especially advantageous manner for producing blended beverages such as smoothies, for example. Accordingly, multiple blades 25a, 25b, 25c, 25d are attached to the stirrer plate 24 of the preferred cutting and/or stirring unit 20 and project from the stirrer plate 24 in different directions. Two blades at a time can be designed as a single piece, for example such as the blades 25b and 25d projecting from the top of the stirrer plate 24. As is known to a person skilled in the art, the top of the stirrer plate 24 is the side of the stirrer plate 24 facing away from the shaft 22. From their point of attachment at the center of the top of the stirrer plate 24, the blades 25b and 25d initially extend radially outward parallel to the stirrer plate 24, and then project upwards, for example at an angle of 20 to 70 degrees from the plane defined by the stirrer plate 24. As is evident from FIG. 8d, for example, the diameter of the stirrer plate 24 is significantly larger than the section of the blades 25b and 25d in which they extend radially outward parallel to the stirrer plate 24. Preferably the diameter of the plate 24 is at least approximately 2 cm, more preferably at least approximately 3 cm.

According to a preferred embodiment, multiple semicircular holes are also provided in the stirrer plate 24. In this design, a quadrant-shaped dome 26a, 26b, 26c, 26d is connected to the circular arc of each semicircular hole in the stirrer plate 24, and extends in an arc over a semicircular hole on the top of the stirrer plate 24, which is to say on the side of the stirrer plate 24 facing away from the shaft 22. In each case, the inside of a quadrant-shaped dome and a semicircular hole form a passage that permits fluid communication between the top and bottom of the stirrer plate 24.

As shown in FIGS. 8a through 8d, a preferred cutting and/or stirring unit 20 preferably has four blades 25a, 25b, 25c, 25d, which project from the stirrer plate 24, as well as four semicircular holes in the stirrer plate 24, each with a quadrant-shaped dome 26a, 26b, 26c, 26d extending over it in an arc. As can be seen especially well in FIGS. 8a and 8c and has already been described above, two of the blades, namely blades 25b and 25d, project upward from the top of the stirrer plate 24 of the preferred cutting and/or stirring unit 20, specifically at an angle of, for example, 20 to 70 degrees with respect to the plane defined by the stirrer plate 24. As a result of this design, in the operating position of the drive unit 12 and when a mixing container 30 (or cleaning container 50) is attached to the attachment section 18 of the drive unit 12, the blades 25b and 25d of the preferred cutting and/or stirring unit 20 rotate in the section of the mixing space defined by the top of the stirrer plate 24 and the inside of the mixing container 30 that is produced by the fluid-tight engagement of the mixing container 30 by the attachment section 18. Preferably one of the blades, namely the blade 25c, extends essentially in the plane of the stirrer plate 24, so that in operation the blade 25c rotates essentially in the section of the mixing space defined by the edge of the stirrer plate 24 and the inside of the mixing container 30 that is produced by the fluid-tight engagement of the mixing container 30 by the attachment section 18. The fourth blade 25a preferably projects downward from the underside of the stirrer plate 24, specifically at an angle of, for example, 20 to 70 degrees with respect to the plane defined by the stirrer plate 24. As a result of this design, in operation the blade 25a rotates in the section of the mixing space produced by the fluid-tight engagement of the mixing container 30 by the attachment section 18 that is defined by the underside of the stirrer plate 24, the inside of the mixing container 30, and the floor of the attachment section 18.

Figure 8A:
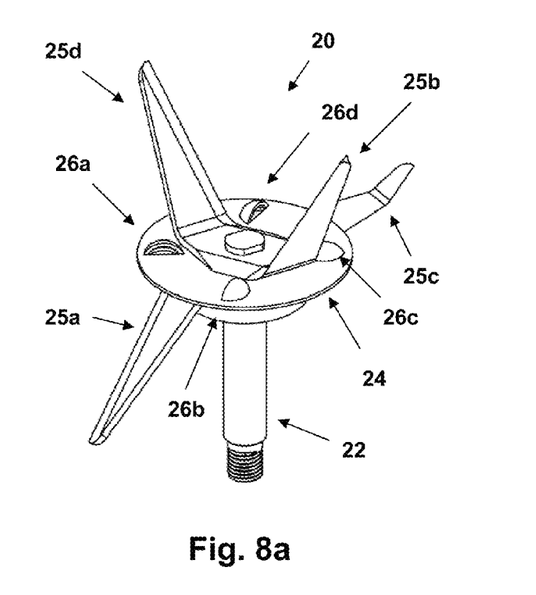
FIGS. 8a through 8d show different views of a preferred cutting and/or stirring unit, which is suitable for use with the drive unit of the kitchen appliance according to the invention.
Figure 8B:
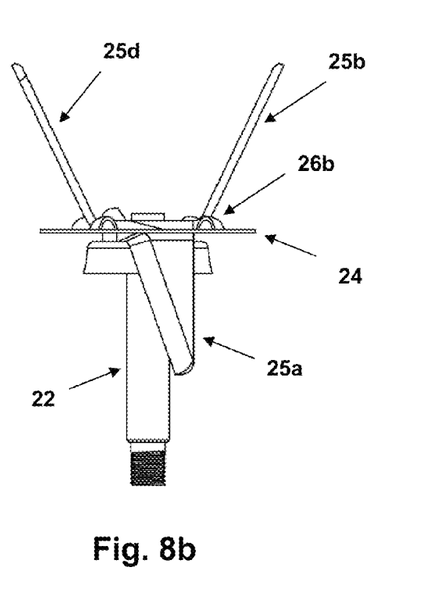
Figure 8C:
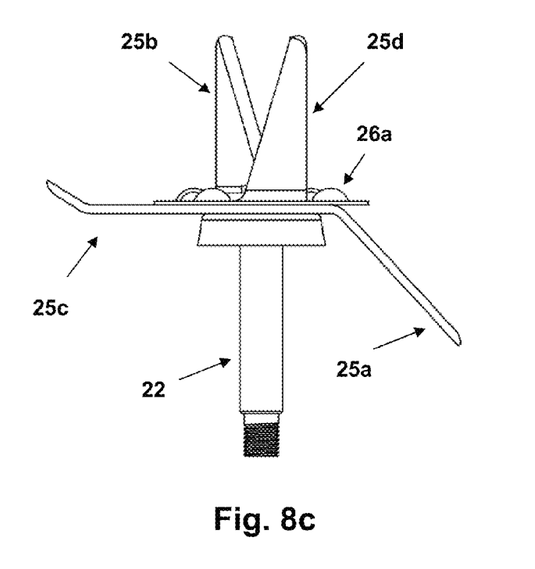
Figure 8D:
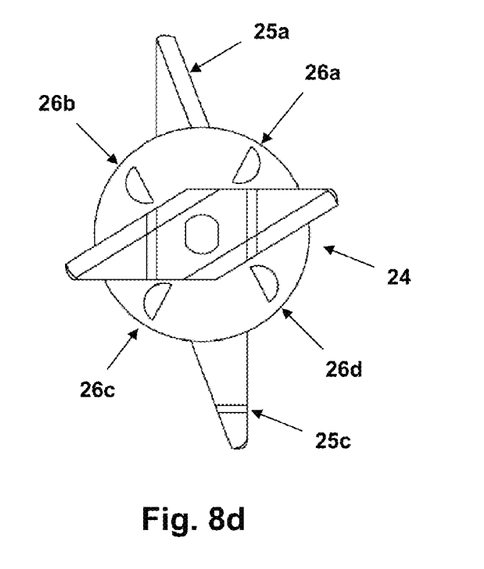

As can be seen especially well in FIGS. 8a and 8d, the four semicircular holes with a quadrant-shaped dome 26a, 26b, 26c, 26d arching over each one are arranged on the stirrer plate 24 such that the openings of the passages formed by the semicircular holes and the quadrant-shaped domes 26a, 26b, 26c, 26d face in one of the directions of rotation on the top of the stirrer plate 24. The openings of the passages formed on the top of the stirrer plate 24 by the semicircular holes and the quadrant-shaped domes 26a, 26b, 26c, 26d can all face in one direction of rotation, or, as shown in FIGS. 8a and 8d, two of the openings can face clockwise and two of the openings can face counterclockwise. This special design of the inventive cutting and stirring unit 20 makes for an especially pleasant consistency of the blended drink. Of course, still other orientations of the openings are also possible.

The kitchen appliance 10 according to the invention has advantages over conventional kitchen appliances for the following reasons. All elements of the kitchen appliance 10 according to the invention that come into contact with foodstuffs, i.e. the attachment section 18, the cutting and/or stirring unit 20, and the mixing container 30, are readily accessible and can be cleaned easily.

Based on the embodiments described above, a person skilled in the art will recognize that additional advantageous embodiments can be realized on the basis of the kitchen appliance according to the invention. In particular, a person skilled in the art will recognize that the support unit can assume numerous different shapes. The only essential point is that the support unit provides a bearing for the drive unit that permits swiveling of the drive unit from a rest position into an operating position and back again. A person skilled in the art will further recognize that the kitchen appliance according to the invention can be used to advantage with cutting and/or stirring units other than the preferred unit described here. A person skilled in the art will further recognize that the engagement of the mixing container by the attachment section to form a mixing space into which the cutting and/or stirring unit projects can also be achieved by a mechanism other than the interaction of the pilot slots and groove sections of the attachment section with the lugs of the mixing container described here. Moreover, a person skilled in the art will recognize that, even though the present invention has been described in connection with a kitchen appliance for producing blended beverages, the swivel mechanism according to the invention can be used to equally good advantage with other kitchen appliances for processing food, for example a kitchen appliance for grinding coffee beans. Finally, a person skilled in the art will recognized that the terms used herein, such as "up" or "down", "front" or "back" and the like, are not in any way intended to limit the orientation of the inventive elements described thereby, but rather serve only to distinguish these elements from one another.

List of Reference Characters
10 Kitchen appliance
12 Drive unit
13 Drip tray
14 Support unit
15 Base
16a, 16b Support arms
17 Suction cups
18 Attachment section
19a, 19b Pilot slots
20 Cutting and/or stirring unit
22 Shaft
24 Stirrer plate
25a-d Blade
26a-d Quadrant-shaped domes
30 Mixing container
32a, 32b Lugs of the mixing container
40 Detent switch
50 Cleaning container
52a, 52b Lugs of the cleaning container
60a, 60b Gears
A Axis of rotation

What is claimed is:

1. Kitchen appliance for processing food, wherein the kitchen appliance comprises:
    a drive unit, which has a cutting and/or stirring unit and is swivel-mounted in a support unit so that the drive unit, together with the cutting and/or stirring unit, can be swiveled from a rest position into an operating position and back again;
    an attachment section which is designed to accommodate a mixing container in such a way that the attachment section and the mixing container define a hermetically sealed mixing space, in which the cutting and/or stirring unit is located, wherein the attachment section is comprised of a cylindrical recess in the drive unit, and wherein multiple pilot slots designed to accommodate lugs of complementary shape of a mixing container are provided on the inside of the circumference of the attachment section, with each of the pilot slots transitioning to a groove section extending a short distance in the circumferential direction, wherein each groove section narrows with increasing distance from the pilot slot standing in connection therewith, so that when the lugs of a mixing container are introduced into the groove sections of the pilot slots, the mixing container is pressed against the floor of the attachment section;
    wherein, when the drive unit is in the operating position, the cutting and/or stirring unit is arranged in the lower section of the mixing space in such a way that food located in the mixing container is fed to the cutting and/or stirring unit on account of gravity, and
    wherein at least one safety switch projects under preloading into the groove section of one of the pilot slots, wherein in this extended position of the safety switch, the supply of electricity to the drive unit is interrupted, and wherein, if a mixing container is then brought into a fluid-tight engagement with the drive unit, a lug of the mixing container introduced into the groove section pushes the safety switch against the preloading into a retracted position in which the interruption in the supply of electricity to the drive unit is removed.

2. Kitchen appliance according to claim 1, wherein the support unit includes a base and two support arms for swivel-mounting of the drive unit.

3. Kitchen appliance according to claim 1, wherein the attachment section, in the form of a cylindrical dish, and the cutting and/or stirring unit are designed as an insert that can be removed from and replaced back in the drive unit.

4. Kitchen appliance according to claim 1, wherein the kitchen appliance is designed such that the swiveling of the drive unit together with the cutting and/or stirring unit from the rest position into the operating position takes place about an angle of 180 degrees.

5. Kitchen appliance according to claim 1, wherein the kitchen appliance additionally includes a detent switch for supplying electricity to the drive unit that is positioned and designed such that it is in a snapped-in position when the drive unit is in the rest position, in which position the electricity supply to the drive unit is interrupted by the detent switch, and when the drive unit swivels into the operating position snaps out due to a preloading and supplies electricity to the drive unit for rotation of the cutting and/or stirring unit.

6. Kitchen appliance according to claim 1, wherein the cutting and/or stirring unit comprises:
    an essentially solid stirrer plate, which can be coupled through a shaft to the drive unit so that the stirrer plate of the drive unit can be set in rotation; and
    at least one blade, which is attached to the stirrer plate and projects from the stirrer plate.

7. Kitchen appliance according to claim 6, wherein at least one semicircular hole is provided in the stirrer plate and a quadrant-shaped dome is connected to the circular arc of the semicircular hole, so that the inside of the quadrant-shaped dome and a semicircular hole form a passage that permits fluid communication between the top and bottom of the stirrer plate.

8. Kitchen appliance according to claim 6, wherein the diameter of the stirrer plate is at least approximately 2 cm.

9. Kitchen appliance according to claim 6, wherein the diameter of the stirrer plate is at least approximately 3 cm.

10. Kitchen appliance according to claim 1, wherein the cutting and/or stirring unit includes four blades and four semicircular holes with four quadrant-shaped domes arching over the holes.

* * * * *